United States Patent
Speer et al.

(10) Patent No.: US 10,929,124 B2
(45) Date of Patent: Feb. 23, 2021

(54) APPLICATION RELEASE USING INTEGRATION INTO UNIFIED CODE SYSTEM

(71) Applicant: Workday, Inc., Pleasanton, CA (US)

(72) Inventors: Christopher Speer, Oakland, CA (US); Shakir Karim, Oakland, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/145,754

(22) Filed: Sep. 28, 2018

(65) Prior Publication Data
US 2020/0104120 A1   Apr. 2, 2020

(51) Int. Cl.
*G06F 8/71* (2018.01)
*G06F 11/36* (2006.01)
*G06F 11/34* (2006.01)
*G06F 21/57* (2013.01)

(52) U.S. Cl.
CPC ............ *G06F 8/71* (2013.01); *G06F 11/3409* (2013.01); *G06F 11/3664* (2013.01); *G06F 11/3688* (2013.01); *G06F 21/577* (2013.01); *G06F 2221/033* (2013.01)

(58) Field of Classification Search
CPC .... G06F 8/60–62; G06F 8/65; G06F 8/70–71; G06F 11/36–3696; G06F 8/71; G06F 11/3409; G06F 11/362; G06F 11/3664; G06F 11/3668; G06F 11/3672; G06F 11/3688; G06F 11/3692; G06F 11/3696; G06F 21/577; G06F 2221/033
USPC .................. 717/120–123, 168–178
See application file for complete search history.

(56) References Cited

U.S. PATENT DOCUMENTS

| | | | | |
|---|---|---|---|---|
| 8,127,275 | B1 * | 2/2012 | Hampapuram | G06F 11/3672 714/38.1 |
| 9,733,921 | B1 * | 8/2017 | Saenz | G06F 8/65 |
| 10,108,533 | B1 * | 10/2018 | Parasuraman | G06F 11/3664 |
| 10,182,107 | B2 * | 1/2019 | Jain | G06F 21/31 |
| 10,223,658 | B2 * | 3/2019 | Cornilescu | G06F 8/71 |
| 2003/0046681 | A1 * | 3/2003 | Barturen | G06F 8/71 717/177 |
| 2004/0068713 | A1 * | 4/2004 | Yannakoyorgos | G06F 11/3672 717/101 |
| 2007/0168571 | A1 * | 7/2007 | Ramsey | G06F 8/65 710/8 |

(Continued)

OTHER PUBLICATIONS

M. Hahn, S. G. Sáez, V. Andrikopoulos, D. Karastoyanova and F. Leymann, "SCEMT: A Multi-tenant Service Composition Engine," 2014 IEEE 7th International Conference on Service-Oriented Computing and Applications, Matsue, 2014, pp. 89-96, doi: 10.1109/SOCA.2014.9. (Year: 2014).*

*Primary Examiner* — Andrew M. Lyons
(74) *Attorney, Agent, or Firm* — Van Pelt, Yi & James LLP

(57) ABSTRACT

A system for application integration into a unified code system includes an interface and a processor. The interface is configured to receive a source code bundle. The processor is configured to create an application bundle based at least in part on the source code bundle and integrate the application bundle into the unified code system. The system for application integration executes the unified code system. The unified code system includes a plurality of application bundles. Only one version of each application bundle is available for execution as part of the unified code system.

22 Claims, 8 Drawing Sheets

(56) References Cited

U.S. PATENT DOCUMENTS

| | | | | |
|---|---|---|---|---|
| 2011/0271278 A1* | 11/2011 | Dittrich | G06F 8/60 | 718/1 |
| 2011/0295727 A1* | 12/2011 | Ferris | G06F 11/34 | 705/34 |
| 2012/0030672 A1* | 2/2012 | Zygmuntowicz | G06F 8/60 | 718/1 |
| 2014/0019952 A1* | 1/2014 | Shamsaasef | G06F 8/65 | 717/170 |
| 2014/0101640 A1* | 4/2014 | Romdhane | G06F 11/3684 | 717/125 |
| 2014/0289391 A1* | 9/2014 | Balaji | H04L 43/04 | 709/224 |
| 2015/0089031 A1* | 3/2015 | Kalali | H04L 67/34 | 709/220 |
| 2015/0089066 A1* | 3/2015 | Meswani | H04L 47/741 | 709/226 |
| 2015/0293759 A1* | 10/2015 | Zhao | H04L 41/082 | 717/168 |
| 2016/0026438 A1* | 1/2016 | Wolfram | G06F 16/00 | 717/109 |
| 2016/0162286 A1* | 6/2016 | Bankole | G06F 8/71 | 717/170 |
| 2016/0234625 A1* | 8/2016 | Wang | H04L 67/06 | |
| 2018/0060210 A1* | 3/2018 | Pandey | G06F 11/368 | |
| 2018/0067734 A1* | 3/2018 | Prasad | G06F 8/61 | |
| 2018/0253296 A1* | 9/2018 | Brebner | G06F 15/16 | |
| 2019/0102162 A1* | 4/2019 | Pitre | G06F 8/65 | |
| 2019/0171437 A1* | 6/2019 | Guda | G06F 8/65 | |
| 2019/0196944 A1* | 6/2019 | Bhide | G06F 11/3684 | |
| 2019/0227794 A1* | 7/2019 | Mercille | G06F 8/36 | |
| 2019/0243665 A1* | 8/2019 | Bolik | G06F 8/60 | |
| 2019/0243742 A1* | 8/2019 | Natari | G06F 8/60 | |
| 2019/0294461 A1* | 9/2019 | Woods | G06F 16/14 | |
| 2020/0007550 A1* | 1/2020 | Hede | H04L 63/0853 | |

\* cited by examiner

APPLICATION RELEASE USING INTEGRATION INTO UNIFIED CODE SYSTEM

BACKGROUND OF THE INVENTION

A system for application distribution receives application code from one or more developers, builds an application, validates the application, and in the event that the application is validated, makes the application available to system users. For example, an application distribution system associated with an online platform (e.g., Salesforce) makes applications available for use by users of the online platform. As applications are updated, the updated versions are made available to system users. System users that have a previous version may decide to update, or they may decide that updating is not worth the trouble and continue using the previous version. This creates a problem wherein critical problems discovered with an application (e.g., critical security problems) may be left unfixed because a user did not install the update including the fix provided by the developer.

BRIEF DESCRIPTION OF THE DRAWINGS

Various embodiments of the invention are disclosed in the following detailed description and the accompanying drawings.

DETAILED DESCRIPTION

Figure 1:
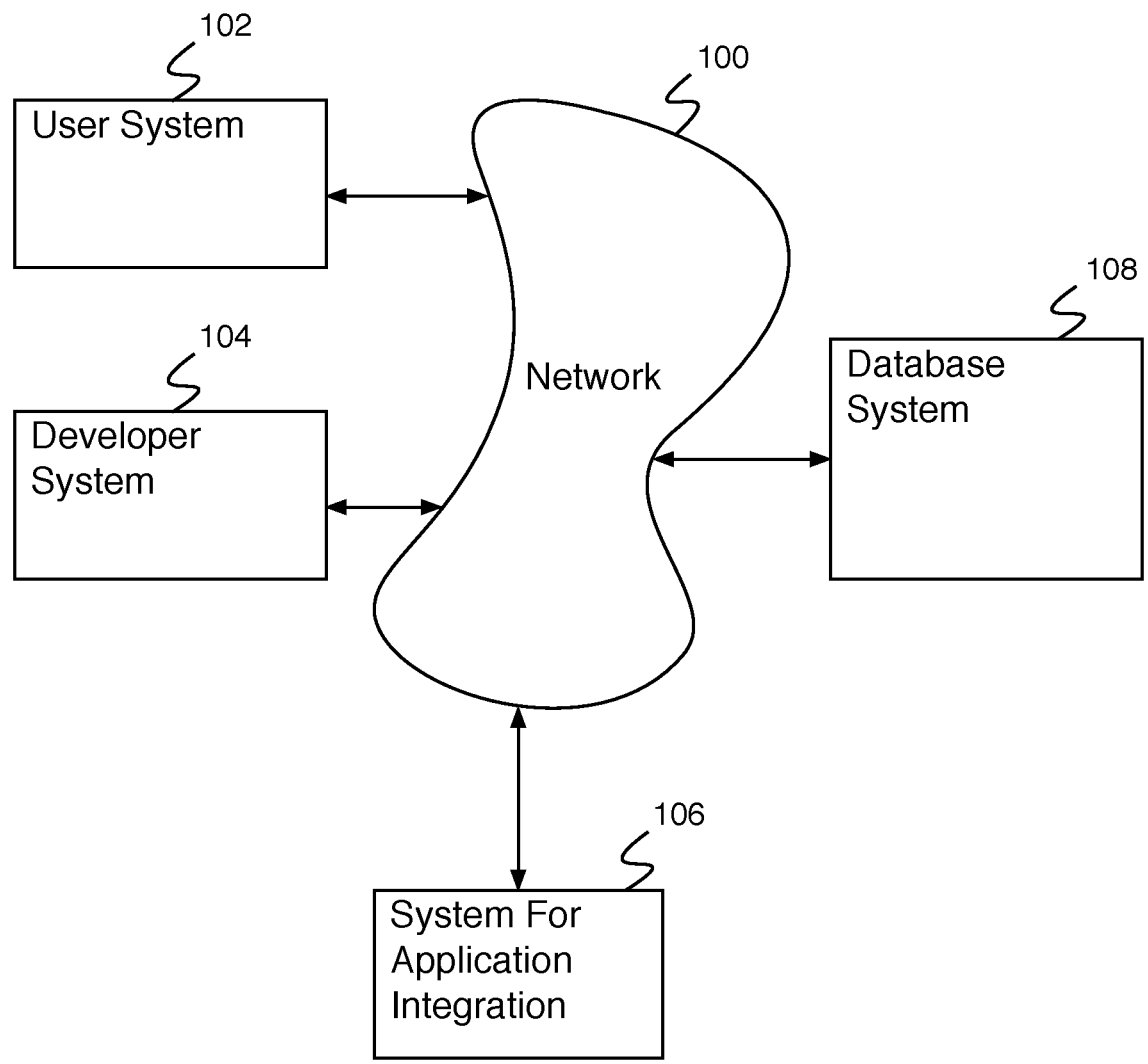
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for application integration into a unified code system is disclosed. The system for application integration into a unified code system comprises an interface configured to receive a source code bundle, a processor configured to create an application bundle based at least in part on the source code bundle and integrate the application bundle into the unified code system, wherein the system for application integration executes the unified code system, wherein the unified code system includes a plurality of application bundles, and wherein only one version of each application bundle is available for execution as part of the unified code system.

The system for application integration into a unified code system comprises an application server comprising part of a tenanted database system. A plurality of users associated with a plurality of tenant organizations access the database system to store data, access data, create reports, execute applications, etc. The tenanted database system comprises a software as a service system—for example, the database and associated applications are stored and executed by server systems managed by the database system provider. Users using the database access the data and applications remotely using a network. As the system grows to include a large number of users taking advantage of a large number of use cases, tenant users require applications beyond that which the database system provider can provide. It is advantageous to provide an application integration system including a mechanism to allow third party developers (e.g., developers neither associated with the database system provider nor directly contracted by them) to develop applications for inclusion as part of the database system. A developer uses a developer system to develop an application and provides the application to the system for application integration. The system for application integration executes a series of tests (e.g., manual tests, automatic tests, tests within an isolated testing environment, unit tests, integration tests, class testing, application programming interface (API) testing, user interface (UI) testing, system security testing, performance and scalability testing, personal identifying information security testing, documentation and translation testing, out of bounds sensitive data testing, documentation testing, etc.). In the event that the application passes the series of tests, the system for application integration integrates the application into the unified code system. Integrating the application into the unified code system comprises adding the application to an application package and associated application pipeline available for execution on an application server (e.g., the system for application integration into a unified code system or another application server comprising part of the tenanted database system). Applications added to the unified code system can be configured to be available to all users accessing the application server or only to a subset of users (e.g., only to users that have purchased a license, only to tenants that have purchased a license, etc.). A user executing database system applications has access to the database system applications executing on the application server, but not to download and execute applications from the unified code system locally. The application server maintains control over the applications, the versioning, and their execution. In the event an application developer creates an updated version of an application and submits the updated version of the application to the system for application integration, the updated application version is tested (e.g., using the same series of tests as when the application was initially submitted). In the event the updated application version passes the set of tests, the updated application version is integrated into the unified code system. Integrating the updated application version into the unified code system comprises replacing the previous application version with the updated application version. This would occur through the standard process of the unified code system. Only one version of each application is available for execution. In some embodiments, applications are updated on a predetermined schedule (e.g., applications are updated once a day, once a week, once a month, etc.). In some embodiments, automated detection and/or tracking is available to determine a prior version of an application that needs to be replaced with an upgraded version. In some embodiments, the system tracks both the versioning of the application as well as the version in use by a tenant/customer. It is possible to denote application versions as needing to be applied immediately or on a schedule. Part of the integration system is monitoring installed applications to determine the need to apply a new version during an installation window.

The system for application integration improves the database system by creating and maintaining a unified code system providing applications created by developers using external developer systems to database system users. The system for application integration ensures that applications of the unified code system are satisfactory (e.g., pass a set of tests), maintains a single version of the applications available to users via the unified code system, executes the applications of the unified code system when desired by the users, and interacts with the database system. The unified code system comprises a software as a service application system available to database system users, comprising a set of verified applications, wherein only a single version of each application is available. Having the unified code system for application avoids the problems and issues of having multiple versions of an application each potentially with different requirements and with different outputs.

In some embodiments, the system for application integration enables developers to create and manage applications using the unified code system, including: supporting an application lifecycle that guides the process of developing, testing, installing, and upgrading applications; enabling developers to migrate applications from a development environment to other tenants in implementation, sandbox, or production environments; providing a mechanism for external developers to store and manage applications; providing a mechanism for users to install unified code system applications from external developers, keep the applications up to date, and provide a way for users to see the applications they have available. Unified code system applications are custom applications that combine a variety of extension and integration capabilities, optionally paired with external processing, to deliver functionality within the context of the database system for those users that have chosen to install the application. Applications include the following extensions to the database system: visual presentation services for the user interface; custom tasks; custom objects; application business objects, functions, reports as a service; custom business processes; calculated fields; custom representational state transfer (e.g., REST) APIs; custom integration system users; and custom security configurations. A typical custom application comprises: a custom business process definition; custom objects; private server pages; custom reports; database queries for accessing relevant database data; custom security domains; and custom integration. A developer building a custom application utilizes a set of development tools including: source code repositories; a repository manager; build pipelines; an artifact repository; deployment automation; and monitoring. A developer iterates on their application and merges to their application repository when desired. Tooling is provided to support the developer in testing their application by running it through a build pipeline or pipelines and producing a packaged artifact stored in an artifact repository. A service provides features for activating a package of artifacts for a tenant, inactivating or uninstalling, and upgrading. Usage and performance of the application is monitored using metering and monitoring tools.

In some embodiments, an application repository manages the resources of an application. The system for application integration provides a set of services including: a management API exposed from an API gateway and presenting endpoints for synchronous requests for basic operations including retrieving metadata describing an application; background services including asynchronous methods where a function validates a request and places it on a queue for processing by a service node running in a cluster; code repositories, for example git repositories, one repository per application, accessible by the developer in the same way an online repository would be accessed (e.g., from a command line, provided user interface, and/or development environment), holding a single application including each version of the application; building pipelines to package and testing installation of an application; and an artifact repository storing artifacts that have been processed through a pipeline and approved for publishing, including access to the artifacts by the database server for loading applications at runtime.

As a developer progresses on their application, they commit periodically and eventually they have work to promote. Developers will utilize feature branches in the code repository to stage their work prior to merging to a branch. The developer pushes to their feature branch on the repository and creates a pull request to begin the process of merging their changes into mainline or their release branch. Once the pull request has successfully made it through the first pipeline, it is reviewed, commented on, and merged by an administrator in the developer's organization. If the application is ready to be published, the developer or admin submits it for an external review and specifies the version/branch to review. The review pipeline is for the system to test the deployment of the artifact before being published and to perform any automated analysis of the application. A successful pass through this pipeline, along with a passing manual review by the system results in the versioned artifact being published to the artifact repository. The artifact repository provides the network with application artifacts that are validated, reviewed, and authenticated. The database system reads from the artifact repository to retrieve artifacts that have been installed for a customer during system load.

A custom application must go through an activation process prior to a customer tenant actually using the app.

The purpose of this process is to load, configure, and seed any data in the application prior to its use. A key selling aspect of the unified code system is the premise that all customers are always on a single code line that is the most recent release. While not all customers will utilize all custom applications, each customer using a custom application will always be using the most recently released version of that application as will all tenants using the application. This way there is no confusion about which version of a given application the customer is using, nor a myriad of upgrade targets, or even manual upgrade requirements. There are some restrictions to custom applications. First, custom applications are delivered to tenants following the standard development pipeline. Custom applications, stored in the application repository, are introduced to a user environment by merging the application packages into the artifacts produced by the system's pipelines. In this way, the system controls the schedule and mechanism of delivering these apps. Next, these applications are required to support upgrade in much the same way database system applications themselves are upgraded, even to the point of supporting a zero down time promise. This does not mean that the application itself cannot take time to be upgraded, but that it is capable of being upgraded during the short time allowed for upgrades in a zero down time environment before switching control of the tenant to a newly booted database server.

There will be a process for the tenant to purchase or license a custom application. This process could be very simple for small apps or fairly complex for a larger app from a 3rd party. This licensing information, linked to the customer, is stored in the application hub. Once the application is licensed we need to manage the activation process which starts with registration of the application for tenants associated with the customer. For each tenant, an application registration entry is created and initialized to "ready" to indicate that the tenant has access to the application and should then proceed to configuration. Some apps may have very little configuration while some may have quite a bit to do. Configuration of an application involves the binding of tenant data with the application where parameters and other instructions that guide the behavior of the application are set. For example, the parameters are set up for a setup table of options for a lookup field. In this case, the app might use a standalone custom object to define and keep the setup values and use a configuration step to load values relevant to the customer. Some apps require zero configuration and can just be installed and used. For a case where the application can be configured in an automated way, where bindings are created programmatically, the application package notes in its manifest an integration to run and which the database system triggers. In this case, the integration is able to compute the necessary bindings to the application artifacts. For a case where the configuration is complex, there is no alternative to a user configuring the application. To facilitate this process, the app is packaged with a process and any required tasks and custom objects used to collect the configuration data. The database system will create an instance of this process after loading the app and leave the installed app in a "configuring" state. The last step of the successful process will transition the app to "active" enabling the application's tasks and other executables.

FIG. 1 is a block diagram illustrating an embodiment of a network system. In some embodiments, the network system of FIG. 1 comprises a network system for a system for application integration into a unified code system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, developer system 104, system for application integration 106, and database system 108 communicate via network 100. User system 102 comprises a user system for use by a user. User system 102 stores and/or accesses data on database system 108. A user uses a user system 102 to interact with database system 108—for example, to store database data, to request database data, to create a report based on database data, to create a document, to access a document, to execute a database application, etc. Developer system 104 comprises a developer system for use by a developer. A developer utilizes developer system 104 to develop code—for example, database applications for execution by database system 108. In some embodiments, a developer utilizing developer system 104 to develop database applications for execution by database system 108 comprises a third-party developer (e.g., a developer not associated with either the database system provider or the user system organization). A third-party developer relies on system for application integration 106 for integrating third-party developed applications with database system 108. System for application integration 106 comprises a system for compiling, preparing, testing, and/or deploying third-party developer applications and/or internally developed applications. Deploying applications comprises providing applications for execution on an application server. For instance applications are executed by system for application integration 106, database system 108, an application server associated with database system 108, or any other appropriate server system.

For example, a developer using developer system 104 provides an application (e.g., in the form of a source code bundle) to system for application integration 106. System for application integration 106 performs a series of tests on the source code bundle and creates an application (e.g., in the form of an application bundle). The application bundle is then integrated into a unified code system, wherein the unified code system is executed (e.g., by system for application integration 106, by database system 108, etc.). The unified code system includes a plurality of application bundles (e.g., corresponding to a plurality of applications provided by one or more application developers). Only one version of each application bundle is available for execution as part of the unified code system (e.g., when an application bundle is updated the previous version is removed from availability on the unified code system). In some embodiments, the system for application integration 106 and database system 108 comprise individual systems executing using different hardware components, individual virtual systems executing using the same hardware components, or any other appropriate combination of individual and/or virtual systems executing on the same and/or different hardware components.

Figure 2:
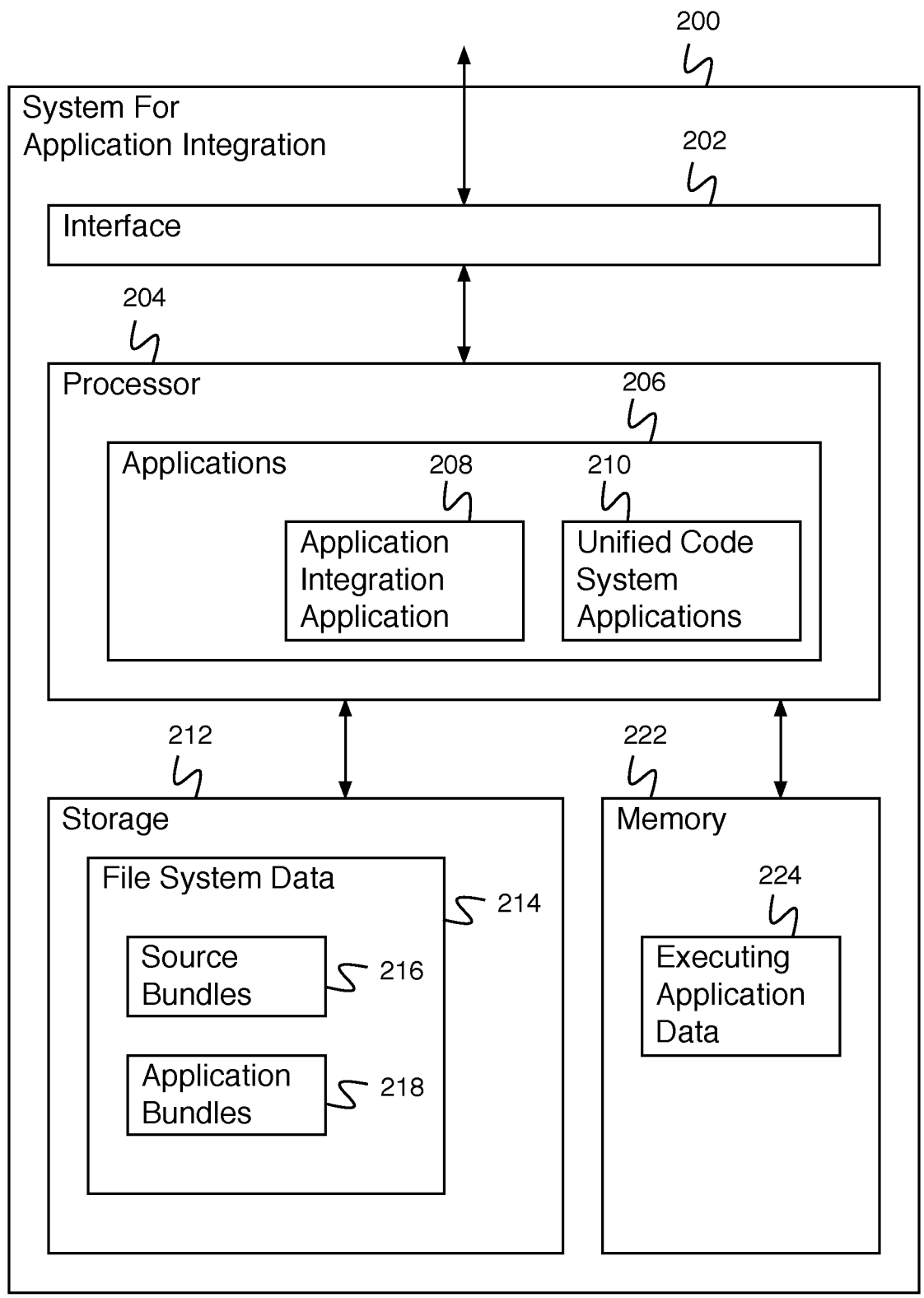
FIG. 2 is a block diagram illustrating an embodiment of a system for application integration.

FIG. 2 is a block diagram illustrating an embodiment of a system for application integration. In some embodiments, system for application integration 200 comprises system for application integration 106 of FIG. 1. In the example shown, system for application integration 200 comprises interface 202. Interface 202 comprises an interface for communicating with external systems using a network. For example, interface 202 comprises an interface for communicating with a developer system (e.g., for receiving a code bundle, for receiving an updated code bundle, for providing feedback, etc.) or for communicating with a user system (e.g., for providing a list of available applications, for receiving an indication to execute an application, etc.). Processor 204 comprises a processor for executing applications 206. Applications 206 comprises application integration application 208 (e.g., an application for receiving a code bundle and integrating the code bundle in to a unified code system) and unified code system applications 210 (e.g., a set of applications comprising a unified code system). For example, application integration application 208 comprises an application configured to receive a source code bundle (e.g., from a developer system via interface 202), create an application bundle based at least in part on the source code bundle (e.g., compile the application, test the application, etc.), and integrate the application bundle into the unified code system. The unified code system is executed and comprises a plurality of application bundles, wherein only one version of each application bundle is available for execution as part of the unified code system. In some embodiments, processor 204 is configured to load the unified code system from storage 212.

For example, applications 206 comprises any other appropriate applications (e.g., a communications application, a chat application, a web browser application, a document preparation application, a data storage and retrieval application, a user interface application, a data analysis application, etc.). Storage 212 comprises file system data 214, comprising source bundles 216 (e.g., a set of source bundles received from developers for integration into the unified code system) and application bundles 218 (e.g., a set of compiled application bundles). For example, application bundles 218 comprises the unified code system. Memory 222 comprises executing application data 224 comprising data associated with unified code system applications 210.

Figure 3:
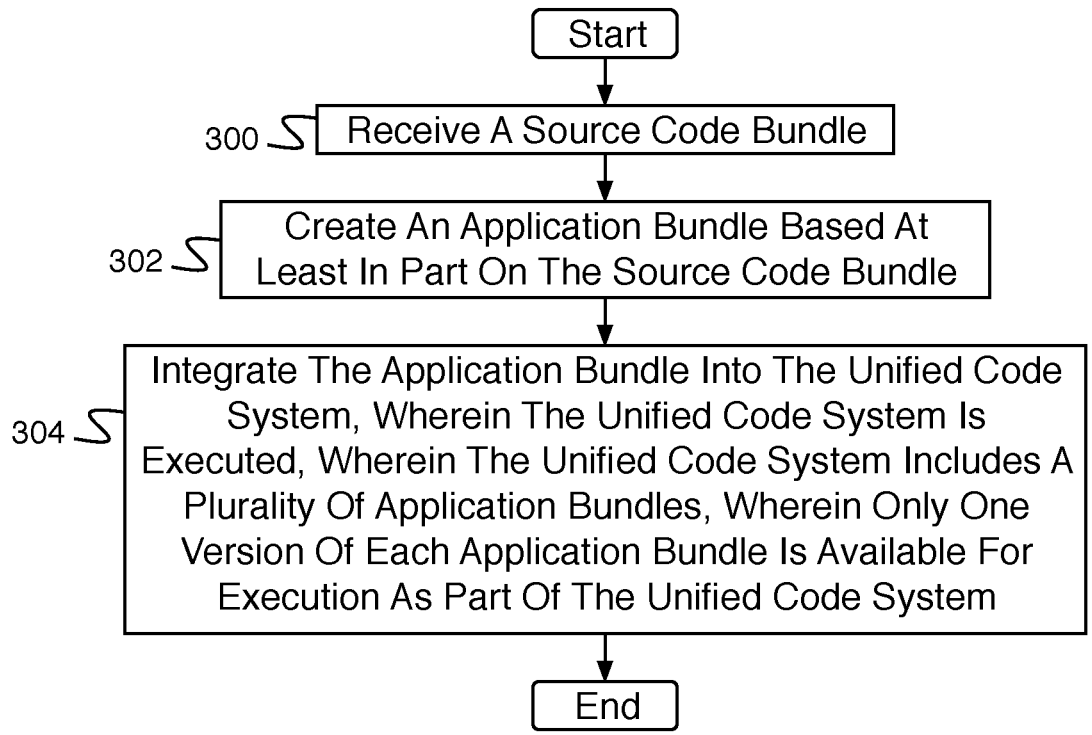
FIG. 3 is a flow diagram illustrating an embodiment of a process for a system for application integration.

FIG. 3 is a flow diagram illustrating an embodiment of a process for a system for application integration. In some embodiments, the process of FIG. 3 is executed by system for application integration 106 of FIG. 1. In the example shown, in 300, a source code bundle is received. For example, a source code bundle comprises source code for a database application from a developer. In 302, an application bundle is created based at least in part on the source code bundle. For example, creating the application bundle comprises compiling the source code bundle, unit testing the application, integration testing the application, etc. In 304, the application bundle is integrated into the unified code system, wherein the unified code system is executed, wherein the unified code system includes a plurality of application bundles, wherein only one version of each application bundle is available for execution as part of the unified code system. For example, the unified code system comprises a set of applications available to a set of users for execution by the system for application integration into the unified code system, wherein only one version of each application of the set of applications is available for execution. The application bundle is integrated into the unified code system in response to an indication (e.g., an indication to add the bundle to the unified code system) or the application bundle is integrated into the unified code system upon system restart. In some embodiments, the system is additionally configured to indicate whether the application bundle is available as part of the unified code system. For example, the system provides a list of available application bundles or responds to a request to indicate whether an application bundle is available.

Figure 4:
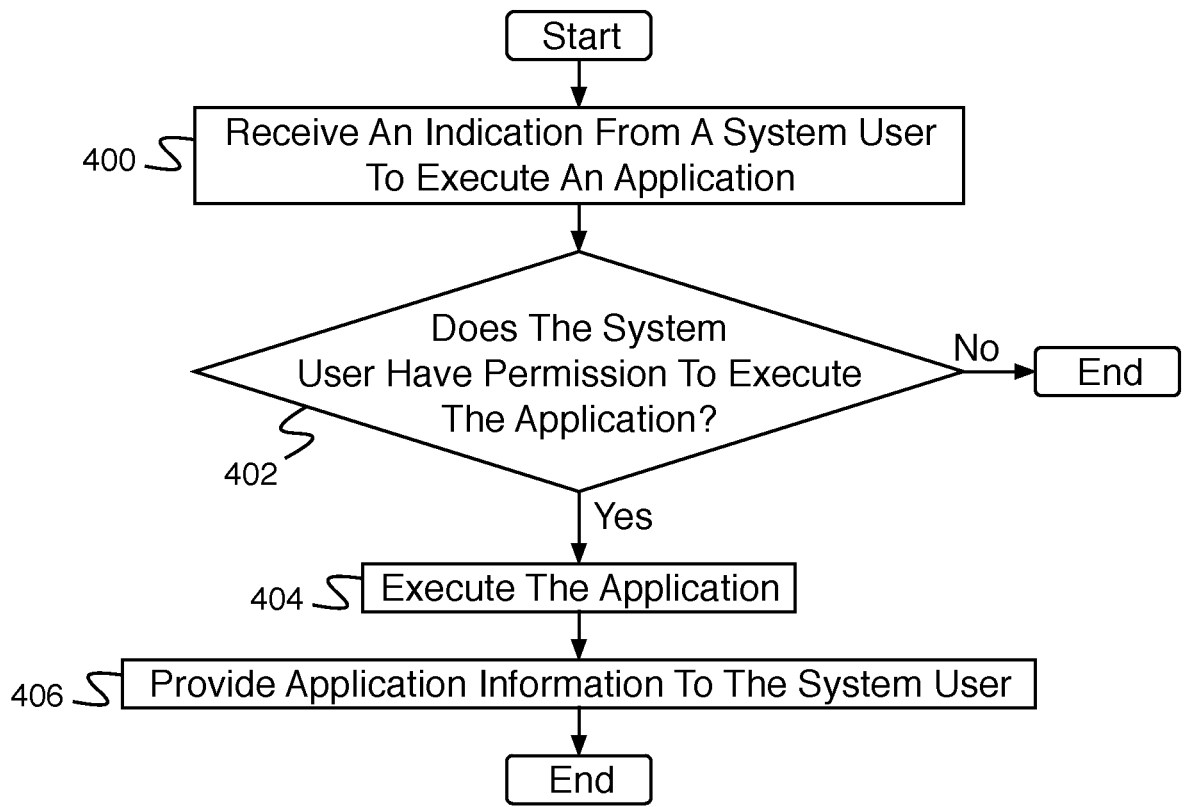
FIG. 4 is a flow diagram illustrating an embodiment of a process for executing an application.

FIG. 4 is a flow diagram illustrating an embodiment of a process for executing an application. In some embodiments, the process of FIG. 4 is executed by an application server of a database system (e.g., system for application integration 106 of FIG. 1, database system 108 of FIG. 1, another application server, etc.). In the example shown, in 400, an indication is received from a system user to execute an application. In 402, it is determined whether the system user has permission to execute the application. For example, whether the user owns a license to execute the application, whether the organization associated with the user owns a license to execute the application, whether the system user has security permission to execute the application, etc. In the event it is determined that the user does not have permission to execute the application, the process ends. In the event it is determined that the user has permission to execute the application, control passes to 404. In 404, the application is executed. In 406, application information is provided to the system user. For example, application results are provided to the system user, report data is provided to the system user, an application user interface is provided to the system user, etc. In some embodiments, the system is additionally configured to monitor usage of the application bundle (e.g., monitoring usage by region, by tenant, by tenant type, monitoring central processing unit (CPU) resources, monitoring memory resources, or monitoring process durations).

Figure 5:
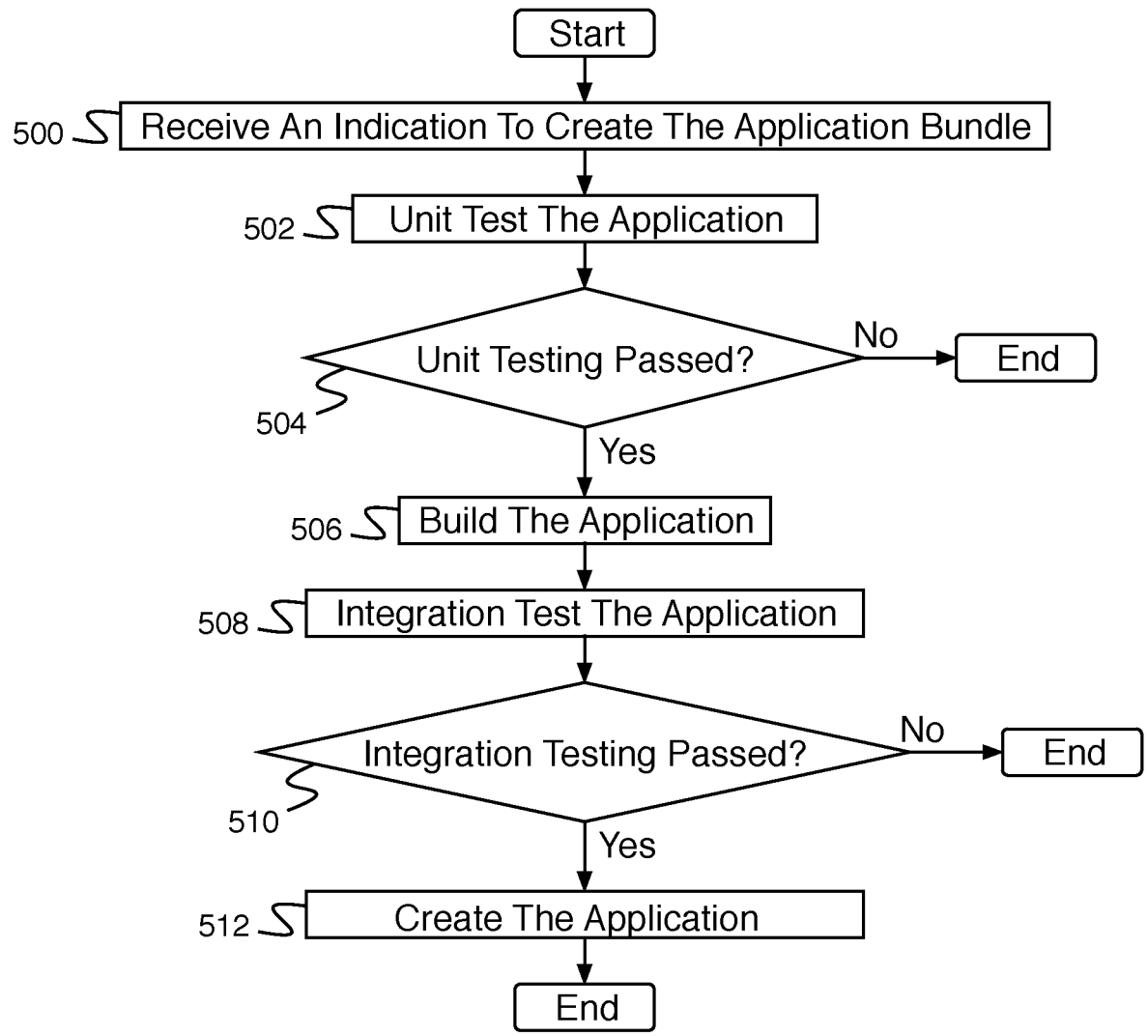
FIG. 5 is a flow diagram illustrating an embodiment of a process for creating an application bundle based at least in part on the source code bundle.

FIG. 5 is a flow diagram illustrating an embodiment of a process for creating an application bundle based at least in part on the source code bundle. In some embodiments, the process of FIG. 5 implements 302 of FIG. 3. In the example shown, in 500, an indication to create the application bundle is received. In some embodiments, the application bundle is the packaged application including manifest, upgrade instructions, and code. In 502, the application is unit tested. In 504, it is determined whether unit testing passed. In the event it is determined that unit testing did not pass, the process ends. In some embodiments, in the event it is determined that unit testing did not pass (e.g., in the event unit testing fails), an indication is provided to an application developer associated with the source code bundle that the unit testing has failed. In the event it is determined that unit testing passed, control passes to 506. In 506, the application is built. In 508, the application is integration tested. In 510, it is determined whether integration testing passed. In the event it is determined that integration testing did not pass, the process ends. In some embodiments, in the event that integration testing did not pass (e.g., that integration testing fails), an indication is provided to an application developer associated with the source code bundle that the integration testing has failed. In the event it is determined that integration testing passed, control passes to 512. In 512, the application is created.

Figure 6:
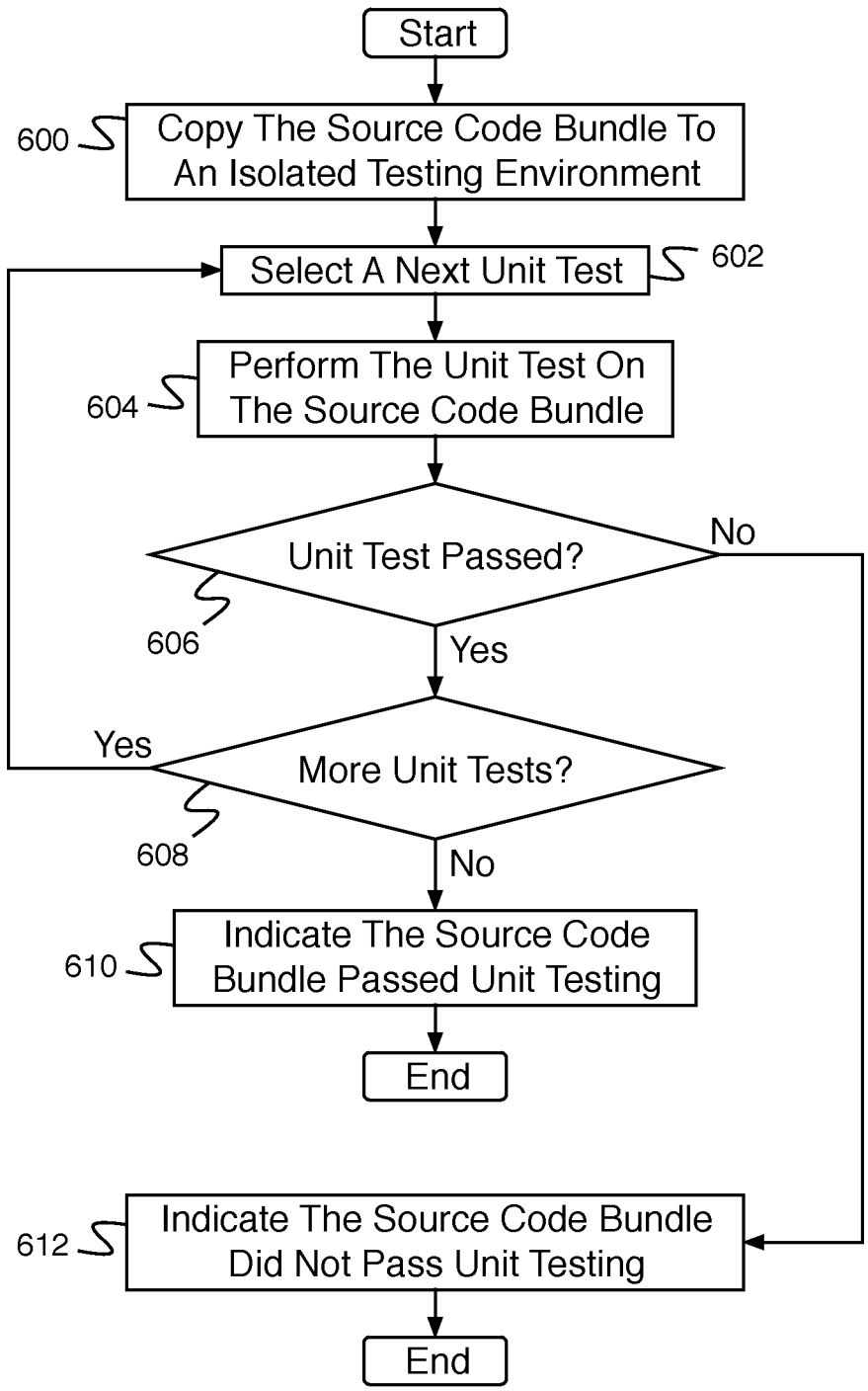
FIG. 6 is a flow diagram illustrating an embodiment of a process for unit testing an application.

FIG. 6 is a flow diagram illustrating an embodiment of a process for unit testing an application. In some embodiments, the process of FIG. 6 implements 502 of FIG. 5. In the example shown, in 600, the source code bundle is copied to an isolated testing environment. In 602, a next unit test is selected. In some embodiments, the next unit test comprises the first unit test. In 604, the unit test is performed on the source code bundle. For example, the unit test tests a functional unit of the source code bundle. In 606, it is determined whether the unit test passed. In the event it is determined that the unit test did not pass, control passes to 612. In 612, the process indicates that the source code bundle did not pass unit testing. In the event it is determined in 606 that the unit test was passed, control passes to 608. In 608, it is determined whether there are more unit tests. In the event it is determined that there are more unit tests, control passes to 602. In the event it is determined that there are not more unit tests, control passes to 610. In 610, the process indicates that the source code bundle passed unit testing.

Figure 7:
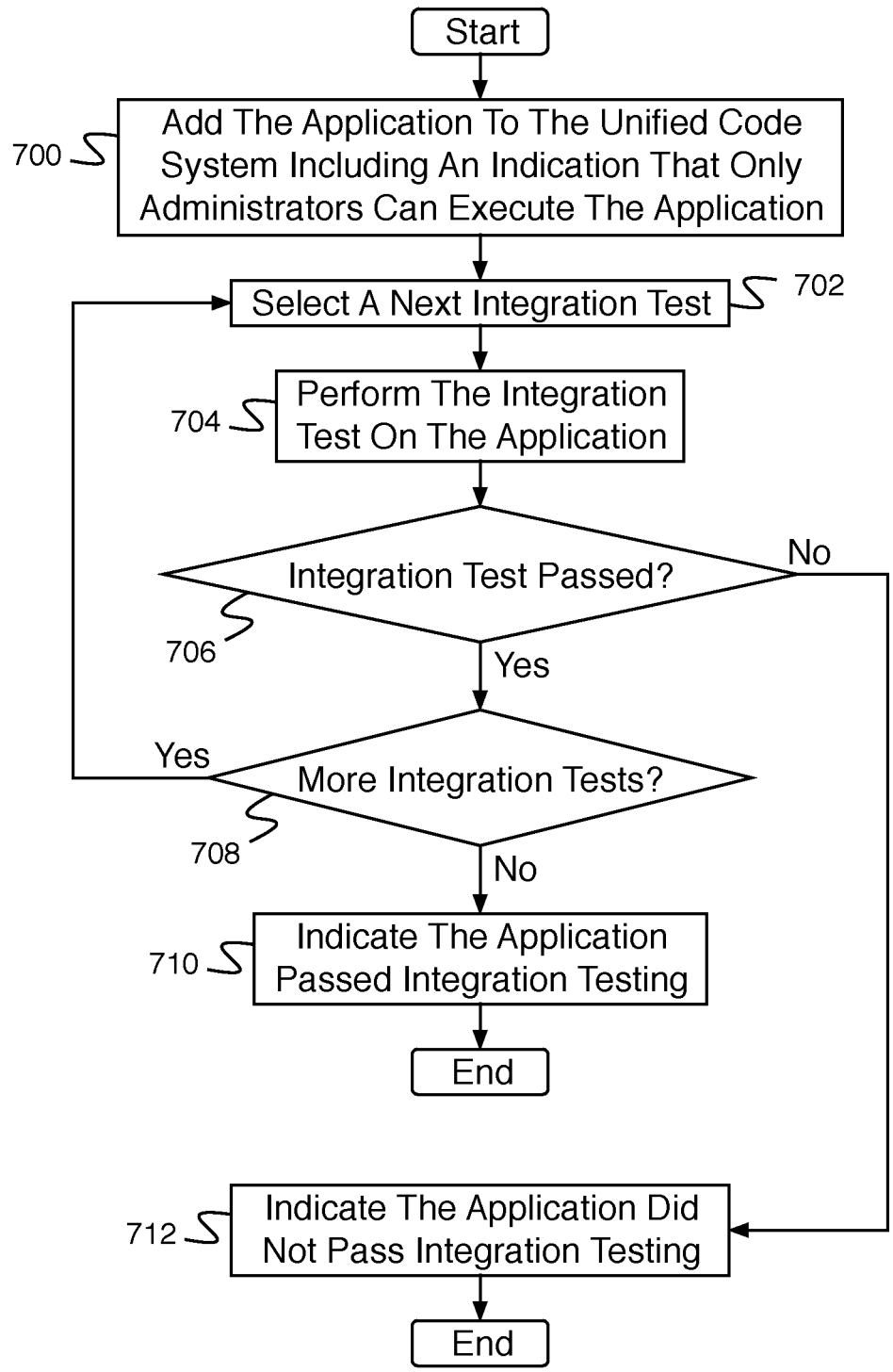
FIG. 7 is a flow diagram illustrating an embodiment of a process for integration testing an application.

FIG. 7 is a flow diagram illustrating an embodiment of a process for integration testing an application. In some embodiments, the process of FIG. 7 implements 508 of FIG. 5. In the example shown, in 700, the application is added to the unified code system including an indication that only administrators can execute the application. In 702, a next integration test is selected. In some embodiments, the next integration test comprises the first integration test. In 704, the integration test is performed on the application. For example, the integration test tests an integrated system aspect of the application. In various embodiments, integration testing comprises testing the application bundle for system security issues, testing the application bundle for personal identifying information security issues, testing the application for out of bounds sensitive data, testing the application bundle for appropriate documentation, or testing the application bundle in any other appropriate way. In 706, it is determined whether the integration test passed. In the event it is determined that the integration test did not pass, control passes to 712. In 712, the process indicates that the application did not pass integration testing. In the event it is determined in 706 that the integration test was passed, control passes to 708. In 708, it is determined whether there are more integration tests. In the event it is determined that there are more integration tests, control passes to 702. In the event it is determined that there are not more integration tests, control passes to 710. In 710, the process indicates that the application passed unit testing.

Figure 8:
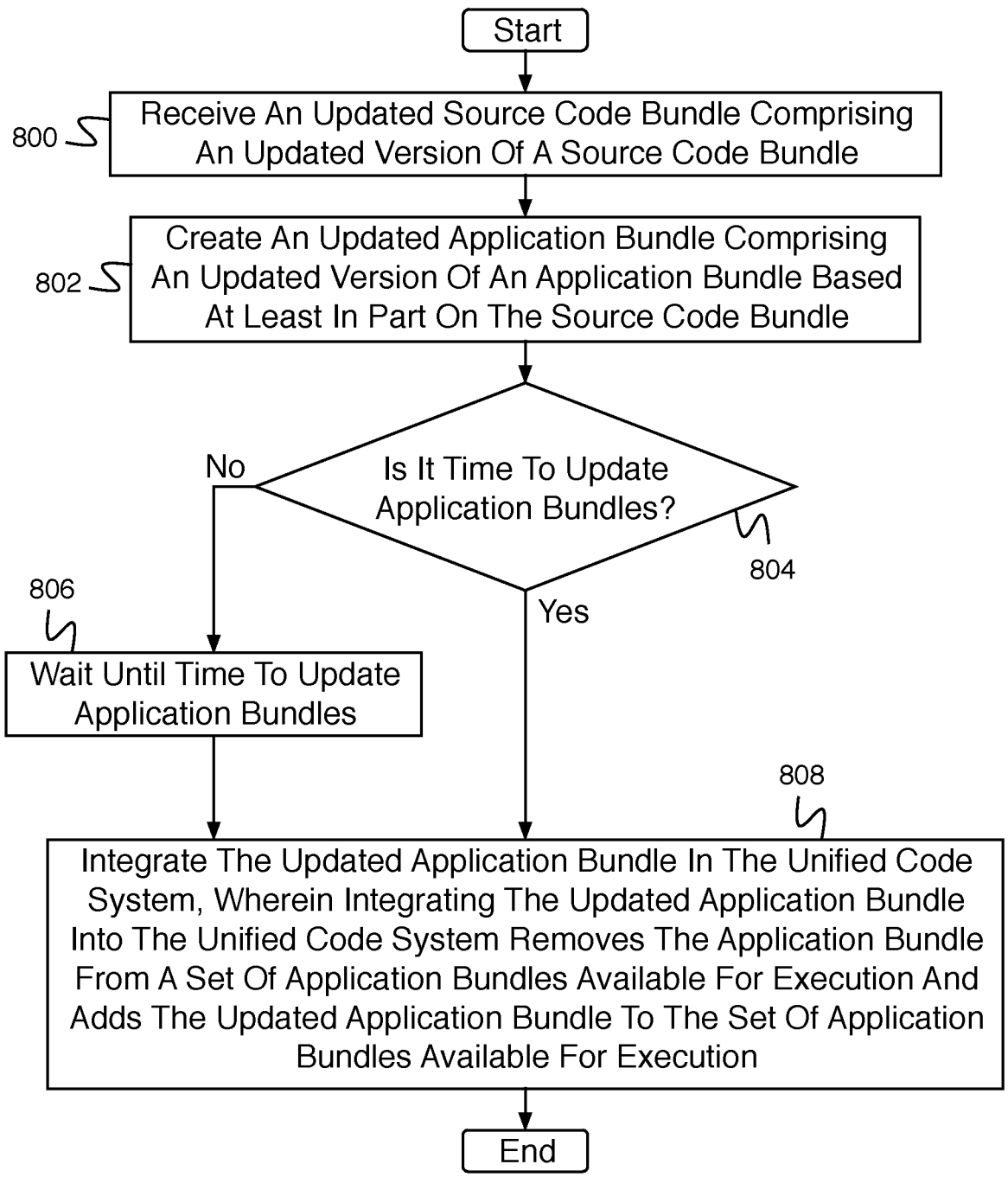
FIG. 8 is a flow diagram illustrating an embodiment of a process for updating an application.

FIG. 8 is a flow diagram illustrating an embodiment of a process for updating an application. In some embodiments, the process of FIG. 8 is executed by system for application integration 106 of FIG. 1. In the example shown, in 800, an updated source code bundle comprising an updated version of a source code bundle is received. In 802, an updated application bundle comprising an updated version of an application bundle based at least in part on the source code bundle is created. In 804, it is determined whether it is time to update application bundles. In the event it is determined that it is not time to update application bundles, control passes to 806. In 806, the process waits until it is time to update application bundles. Control then passes to 808 (e.g., when it is time to update application bundles). In the event it is determined in 804 that it is time to update application bundles, control passes to 808. In 808, the updated application bundle is integrated in the unified code system, wherein integrating the updated application bundle into the unified code system removes a previous application bundle from a set of application bundles available for execution and adds the updated application bundle to the set of application bundles available for execution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for application integration into a unified code system, comprising:
an interface configured to receive a source code bundle;
a processor configured to:
create an application bundle based at least in part on the source code bundle, wherein the application bundle comprises a process used to collect configuration data; and
integrate the application bundle into the unified code system, comprising to:
determine whether a user configuring the application bundle is required for a tenant of a plurality of tenants; and
in response to determining that the user configuring the application bundle is required for the tenant, create an instance of the process used to collect configuration data and provide an indication that the application bundle is in a configuring state for the tenant, wherein the system for application integration executes the unified code system, wherein the unified code system includes a plurality of application bundles, and wherein only a most recent version of each application bundle of the plurality of application bundles is available for execution by the plurality of tenants as part of the unified code system.

2. The system of claim 1, wherein creating the application bundle comprises building the application.

3. The system of claim 1, wherein the processor is further configured to unit test the source code bundle using an isolated testing environment.

4. The system of claim 3, wherein unit testing comprises class testing, API testing, or UI testing.

5. The system of claim 3, wherein the processor is further configured to, in response to the unit testing failing, provide an indication to an application developer associated with the source code bundle that the unit testing has failed.

6. The system of claim 1, wherein the unified code system comprises a set of applications available to a set of users for execution by the system for application integration into the unified code system, wherein only one version of each application of the set of applications is available for execution.

7. The system of claim 1, wherein the processor is further configured to integration test the application bundle as part of the unified code system.

8. The system of claim 7, wherein integration testing comprises testing the application bundle for system security issues, testing the application bundle for personal identifying information security issues, testing the application for out of bounds sensitive data, or testing the application bundle for appropriate documentation.

9. The system of claim 7, wherein the processor is further configured to, in response to integration testing failing, provide an indication to an application developer associated with the source code bundle that the integration testing has failed.

10. The system of claim 1, wherein the application bundle is integrated into the unified code system in response to an indication.

11. The system of claim 1, wherein the application bundle is integrated into the unified code system upon system restart.

12. The system of claim 1, wherein the processor is further configured to monitor usage of the application bundle.

13. The system of claim 12, wherein monitoring usage of the application bundle comprises monitoring usage by region, by tenant, by tenant type, monitoring CPU resources, monitoring memory resources, or monitoring process durations.

14. The system of claim 1, wherein the processor is further configured to:

receive an updated source code bundle, wherein the updated source code bundle comprises an updated version of the source code bundle;

create an updated application bundle based at least in part on the updated source code bundle; and integrate the updated application bundle into the unified code system, wherein integrating the updated application bundle into the unified code system removes a previous application bundle from a set of application bundles available for execution and adds the updated application bundle to the set of application bundles available for execution.

15. The system of claim 1, wherein the system additionally comprises a storage system for storing the unified code system.

16. The system of claim 15, wherein the processor is additionally configured to load the unified code system.

17. The system of claim 1, wherein the processor is additionally configured to indicate whether the application bundle is available as part of the unified code system.

18. The system of claim 1, wherein the processor is additionally configured to:

receive an indication to execute the application bundle; and execute the application bundle as part of the unified code system.

19. The system of claim 1, wherein the application bundle further comprises required tasks and custom objects used to collect the configuration data for the tenant of the plurality of tenants.

20. The system of claim 1, wherein the processor is further configured to, in response to a determination that the user configuring the application bundle is not required for the tenant, load setup values for the tenant and provide an indication that the application bundle is in an active state for the tenant.

21. A method for application integration into a unified code system, comprising:

receiving a source code bundle;

creating an application bundle based at least in part on the source code bundle, wherein the application bundle comprises a process used to collect configuration data; and integrating the application bundle into the unified code system, comprising:

determining whether a user configuring the application bundle is required for a tenant of a plurality of tenants; and in response to determining that the user configuring the application bundle is required for the tenant, creating an instance of the process used to collect configuration data and providing an indication that the application bundle is in a configuring state for the tenant, wherein the unified code system is executed, wherein the unified code system includes a plurality of application bundles, and wherein only a most recent version of each application bundle of the plurality of application bundles is available for execution by the plurality of tenants as part of the unified code system.

22. A computer program product for application integration into a unified code system, the computer program product being embodied in a non-transitory computer readable storage medium and comprising computer instructions for:

receiving a source code bundle;

creating an application bundle based at least in part on the source code bundle, wherein the application bundle comprises a process used to collect configuration data; and integrating the application bundle into the unified code system, comprising:

determining whether a user configuring the application bundle is required for a tenant of a plurality of tenants; and in response to determining that the user configuring the application bundle is required for the tenant, creating an instance of the process used to collect configuration data and providing an indication that the application bundle is in a configuring state for the tenant, wherein the unified code system is executed, wherein the unified code system includes a plurality of application bundles, and wherein only a most recent version of each application bundle of the plurality of application bundles is available for execution by the plurality of tenants as part of the unified code system.

* * * * *

UNITED STATES PATENT AND TRADEMARK OFFICE
CERTIFICATE OF CORRECTION

PATENT NO. : 10,929,124 B2  
APPLICATION NO. : 16/145754  
DATED : February 23, 2021  
INVENTOR(S) : Christopher Speer and Shakir Karim Page 1 of 1

It is certified that error appears in the above-identified patent and that said Letters Patent is hereby corrected as shown below:

On the Title Page

Column 2, item (56), Other Publications, Line 2, delete "SCEMT" and insert --SCE^MT--, therefor.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*